United States Patent Office 3,814,722
Patented June 4, 1974

3,814,722
HEAT CURABLE POLYSILOXANE COMPOSITIONS CONTAINING FIBERS
Frank J. Glaister, Ballston Spa, Verne G. Simpson, Scotia, and George P. De Zuba, Waterford, N.Y., assignors to General Electric Company, Waterford, N.Y.
No Drawing. Filed Dec. 29, 1971, Ser. No. 213,727
Int. Cl. C08g 5/10
U.S. Cl. 260—37 SB
23 Claims

ABSTRACT OF THE DISCLOSURE

A heat curable silicone rubber composition comprising 5% to 94.75% by weight of an organopolysiloxane polymer, 5 to 75% by weight of a fibrous filler, and 0.25 to 10% by weight of an organic additive compound. The composition also includes a silica filler, a peroxide curing agent and a process aid.

BACKGROUND OF THE INVENTION

The invention relates to heat-curable polysiloxane compositions and, in particular, to heat curable polysiloxane compositions containing fibers therein.

In prior developments, asbestos and other fibers have been used as fillers in polysiloxane compositions which were then cured to produce a silicone elastomeric composition used for a variety of purposes. In these disclosures of the prior art, these fibers were not distinguished from other inorganic fillers such as calcium carbonate and not shown to produce any new properties in the resulting composition, but only shown to add stiffness or hardness to the resulting product. However, from the prior art, it is seen that such fibers when used as fillers in polysiloxane compositions produced on the whole inferior types of silicone rubber as compared to the silicone rubber prepared by the use of high reinforcing silica fillers. On the other hand, it was desired to use such fibers as fillers in polysiloxane compositions if polysiloxane rubber compositions could be produced with high tensile strength, high tear strength, high stiffness which compositions were still flexible and had desirable percent of elongation, since most fibers are relatively inexpensive.

It was further desirable to obtain a polysiloxane elastomeric composition which had high heat resistance and a good service life at both high and low temperatures within the temperature range of minus 40° F. up to and above 400° F. Thus, in automobiles it is desirable to have gaskets which will have high strength and remain flexible for long periods of time at temperatures as high as 400° F. On the other hand, it is also desirable that gaskets which often act as seals do not become brittle at low temperatures such as −40° F. to which the mechanisms of the automobile may be exposed. It is also desirable in this respect that hoses formed from a polysiloxane composition have a high tensile strength and retain their strength at high temperatures, as well as at very low temperatures.

Another use for elastomers which have high heat resistance, as well as remain flexible at low temperatures, is to cover electrical wires and electrical components. Since such electrical wires and electrical components are normally exposed to very high temperatures, as well as low temperatures, it is required that the material covering and protecting the wires does not degrade in strength or become brittle at high or low operating temperatures. It is also desired to have polysiloxane elastomers with high tensile strength and stiffness or hardness, high tear strength, good abrasion resistance, flexibility and the desired elongation so that such material could be used as a covering material. The present polysiloxane elastomeric compositions are sometimes lacking in sufficiently high tensile strength and hardness. To produce such polysiloxane elastomeric composition having the above properties which could be put to the uses mentioned above, it was suggested that different fibers be used or incorporated into the polysiloxane composition so that the resulting composition will have the desired properties. However, all approaches or uses of all fibers up to the present time have been found lacking in some respect or other.

As mentioned previously, asbestos was considered for use as a filler in polysiloxane compositions. However, even with the use of asbestos as a filler, the elastomeric polysiloxane compositions that were obtained were found to have only low tensile strength, low tear resistance, as well as not to have a high hardness. The copending application of Frank J. Glaister, Ser. No. 134,438, filed Apr. 15, 1971, now Pat. No. 3,715,329, Feb. 6, 1973, discloses heat curable silicone rubber compositions having the desired properties which are obtained by incorporating asbestos fibers in heat curable silicone rubber compositions in combination with certain acrylic esters. The present case is directed to the use of asbestos fibers as well as other types of fibers in combination with certain hydrocarbon additive compounds to produce silicone rubber having the desired properties.

It is one object of the present invention to produce a heat curable polysiloxane composition with high tensile strength and exceptionally high heat resistance at high temperatures.

It is another object of the present invention to produce a heat curable polysiloxane composition which has good flexibility at low temperatures, as well as at high temperatures.

It is yet still another object of the present invention to produce a heat curable polysiloxane composition having asbestos fibers therein, and having a high hardness value as well as the desired elongation.

It is yet another aim of the present invention to provide a process for producing a heat curable polysiloxane composition which has a high tensile strength, exceptionally good heat resistance, the desired flexibility within a broad temperature range, a high hardness and the desired percent of elognation.

These and other objects of the present invention are accomplished in accordance with the polysiloxane composition and the process for producing this polysiloxane composition set forth below.

SUMMARY OF THE INVENTION

In accordance with the present invention, there is provided a heat vulcanizable silicone rubber composition comprising 15% to 94.75% by weight of an organopolysiloxane polymer having a viscosity of at least 100,000 centipoise at 25° C. of the formula, (1) $$(R)_a SiO_{\frac{4-a}{2}}$$

5% to 75% by weight of fiber and 0.25% to 10.0% by weight of an organic additive compound selected from the group consisting of

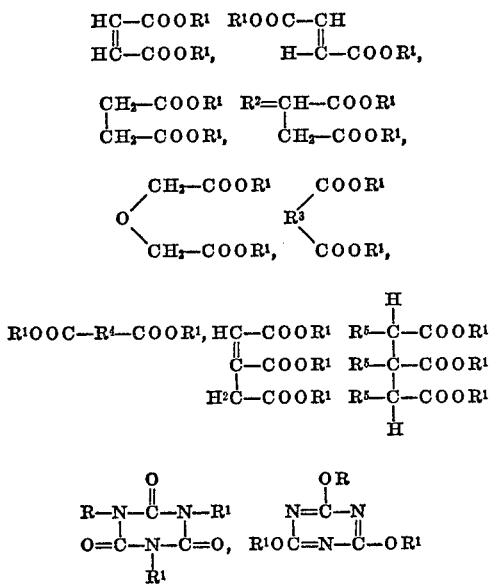

and mixtures thereof, where R and $R^2$ are radicals selected from the group consisting of monovalent hydrocarbon radicals, halogenated monovalent hydrocarbon radicals and cyanoalkyl radicals, $R^1$ is selected from unsaturated monovalent hydrocarbon radicals and unsaturated halogenated monovalent hydrocarbon radicals, $R^3$ is a divalent hydrocarbon radical of up to 20 carbon atoms, $R^4$ is an arylene radical, $R^5$ is selected from the same radicals as R and hydrogen, and $a$ varies from 1.95 to 2.01. The composition also includes a peroxide curing catalyst, and may include a silica filler and a process aid. In place of asbestos fibers, there may be used nylon fibers, dacron fibers, glass fibers, polyester fibers, cotton fibers and other types of fibers as well as mixtures thereof. In the above formulas of the esters, $R^1$ is preferably vinyl or allyl. The cured silicone rubber is formed by mixing the above ingredients and heating the resulting mixture to 80 to 650° C.

DETAILED DESCRIPTION OF THE PREFERRED EMBODIMENT

The radical R and $R^2$ represent hydrocarbon radicals, such as aryl radicals and halogenated aryl radicals such as phenyl, chlorophenyl, xylyl, tolyl, etc.; aralkyl radicals, such as phenylethyl, benzyl, etc.; aliphatic, haloaliphatic and cycloaliphatic, such as alkyl, alkenyl, cycloalkyl, haloalkyl, including methyl, ethyl, propyl, chlorobutyl, cyclohexyl, etc.; cyanoalkyl radicals, such as cyanoethyl, cyanopropyl, cyanobutyl, etc. In the organic additive formulas preferably R is an alkenyl radical. The radicals represented by $R^5$ are selected from the same radicals as represented by R, or hydrogen. The radicals represented by $R^3$ are alkylene and arylene radicals of 1 to 20 carbon atoms, such as methylene, ethylene, etc. Preferably, the radicals R and $R^2$ have 8 carbon atoms or less. Of the R radicals in Formula (1), at least 50% of the R groups are alkyl radicals and preferably methyl radicals. In addition, at least 0.1% by weight of the R groups in Formula (1) are vinyl or represent another unsaturated alkenyl radical. However, the vinyl radical is preferred to the other alkenyl radicals. Thus, in order to obtain the preferred elastomeric composition of the present case which has the exceptional physical properties desired, it is preferred that there be a minimum of at least 0.1% by weight of vinyl or other alkenyl radicals attached to the silicon atom. The concentration of the vinyl or other alkenyl radicals in Formula (1) may vary within the range of 0.1 to 0.6% by weight of the polysiloxane polymer. The $R^1$ radicals are preferably selected from hydrocarbon radicals of 2 to 20 carbon atoms including alkyl, haloalkyl, cycloalkyl, and alkenyl radicals of 2 to 20 carbon atoms, such as methyl, vinyl, allyl, diamyl, etc. Preferably, $R^1$ is an unsaturated hydrocarbon radical of 2 to 10 carbon atoms, such as alkenyl radicals, haloalkenyl radicals, such as vinyl or allyl etc. The radical $R^4$ is a divalent aromatic radical of up to 15 carbon atoms such as arylene or more specifically phenylene.

Besides the organopolysiloxane, there are two necessary ingredients in the composition of the present invention, that is, the fibers and the organic additive. The asbestos fibers are classified in six different categories in accordance with their basic formulas which six categories are given the name of tremolite, crystotile, crocidolite and anthophyllite, amosite and actinolite. All of these types of asbestos fibers have been found to be useful in the composition of the present invention. The crystotile have been found to be superior in producing elastomeric compositions of high physical properties as compared to the other types of asbestos fiber. In particular, crystotile and crocidolite asbestos fiber produce elastomeric compositions of high tensile strength, while anthophyllite asbestos fibers produce an elastomeric composition with exceptionally high heat resistance. As a matter of fact, the tensile strength of elastomeric compositions prepared having an anthophyllite asbestos fiber therein actually improves upon heat aging. For further information as to asbestos, reference is made to the article on Asbestos by G. F. Jenkins appearing in Industrial Minerals and Rocks (Seeley W. Mudd Series), published by the American Institute of Mining, Metallurgical and Petroleum Engineers (1960).

In place of asbestos fibers other types of natural and synthetic fibers may be used in the composition of the present case. Such fibers include polyester fibers, nylon fibers, heat resistant nylon fibers, dacron fibers, glass fibers, acetate fibers, acrylate fibers, rayon fibers, cotton fibers, wool fibers and Teflon fibers. In the present silicone rubber composition, asbestos fibers and nylon fibers and nylon fibers are preferred since with these fibers high tensile strengths are obtained. However, the other fibers discussed above may also be used in the present composition. It should be understood that mixtures of the above fibers may also be used in the present composition and in a mixture of asbestos and nylon fibers or a mixture of three or more of the different types of fibers.

In a mixture of organopolysiloxane polymer of Formula (1), fiber and organic additive compounds, there is generally in the mixture of 15% to 94.75% by weight of the polysiloxane, and preferably 50% to 94.75% by weight. In this mixture, there is 5% to 75% of fiber, preferably the concentration of the fibers varies from 15 to 60 percent by weight of the mixture. As little as 5% fibers would have some effect on the resulting properties of the polysiloxane. At 25% fiber in the polysiloxane mixture there is a substantial effect on the desired physical property of the resulting composition. When the concentration of the fibers exceeds 75% by weight, there is too much fiber relative to organopolysiloxane and, as a result, the composition has poor physical properties. Thus, a preferable concentration of 15% to 60% by weight of fiber provides an organopolysiloxane with the best physical properties. With respect to the organic additive compound, there may be as little as 0.25% by weight of one of the hydrocarbon additive compounds defined above in the polysiloxane composition and this amount of organic aditive compound will produce some resulting benefit in the physical properties of the resulting cured silicone rubber. It should be understood that the less fiber there is in the polysiloxane composition, the less organic additive compound needed. Further, when there is as much as 75% by weight of fibers in the composition, there may be as much as 10% by weight of organic additive compound based on the weight of the resulting composition. If there is more than 10% by weight of organic additive compound in the composition, such an excess is not needed and does not produce any desirable results. Preferably, the amount of fiber is between 25% to 60% of the composition. The preferable concentration for the organic additive compound is 0.25–5% by weight.

The organic additive compounds, isocyanates and cyanurates are materials well known in the art which can be obtained from various manufacturers of chemicals. Thus, the esters of the formula, $$\begin{array}{cc} HC-COOR^1 & R^1OOC-CH \\ \| & \| \\ HC-COOR^1, & H-C-COOR^1 \end{array}$$

are manufactured and sold by FMC Corporation and Sartomer Resins, Inc. The esters of the formula, $$\begin{array}{cc} CH_2-COOR^1 & R_2=CH-COOR^1 \\ | & | \\ CH_2-COOR^1, & CH_2-COOR^1 \end{array}$$

are manufactured and sold by Borden Chemical Company.

The ester of the formula, $$O \diagdown \begin{array}{c} CH_2-COOR^1 \\ CH_2-COOR^1 \end{array}$$

are manufactured and sold by Borden Chemical Company.

The ester of the formula, $$R^3 \diagdown \begin{array}{c} COOR^1 \\ COOR^1 \end{array}$$

are manufactured and sold by Hardwicke Chemical Company.

The ester of the formula, $$R^1OOC\;R^4\;COOR^1$$

is manufactured and sold by FMC Corporation.

The ester of the formula, $$\begin{array}{c} HC-COOR^1 \\ \| \\ C-COOR^1 \\ | \\ H_2C-COOR^1 \end{array}$$

is manufactured and sold by Aldrich Chemical Company.

The ester of the formula, $$\begin{array}{c} H \\ | \\ R_5-C-COOR^1 \\ | \\ R_5-C-COOR^1 \\ | \\ R_5-C-COOR^1 \\ | \\ H \end{array}$$

is manufactured and sold by Borden Chemical Company.

The isocyanurate of the formula, $$\begin{array}{c} O \\ \| \\ R^1-N-C-N-R^1 \\ | \quad | \\ O=C-N-C=O \\ | \\ R^1 \end{array}$$

is manufactured and sold by Allied Chemical Company.

The cyanurate of the formula, $$\begin{array}{c} OR^1 \\ | \\ N=C-N \\ | \quad \| \\ R^1OC=N-C-OR^1 \end{array}$$

is manufactured and sold by American Cyanamid Company.

In the above formula, R, $R^1$, $R^2$, $R^3$, $R^4$ and $R^5$ are as defined previously.

Preferred organic additives within the scope of the above formulas are: Triallyl isocyanurate, triallyl cyanurate, diallyl maleate, diallyl fumurate, diallyl o-phthalate, diallyl ter-phthalate, diallyl adipate, diallyl malonate, diallyl glycolate, diallyl succinate, diallyl citraconate, diallyl sebacate, methyl-diallyl isocyanurate, methyl-diallyl cyanurate, diallyl glutarate, divinyl glutarate, divinyl succinate, divinyl alipate, divinyl sebacate and triallyl aconitate.

There are also within the scope of Formula (1), polydiorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, as well as copolymers of dimethylsiloxane units, methylvinylsiloxane units and diphenylsiloxane units.

Preparation of the diorganopolysiloxane of Formula (1) which can contain both saturated and olefinicially unsaturated hydrocarbon groups may be carried out by any of the procedures well known to those skilled in the art. Such polysiloxanes can be produced by following a procedure involving hydrolysis of one or more hydrocarbon-substituted dichlorosilanes in which the substitutents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boiling, low molecular weight cyclic polymers and undesirable material such as the monofunctional and trifunctional chlorosilane starting material. The resulting compositions are fractionally distilled and there is collected two pure products containing the low boiling, low molecular weight cyclic polymers free of any significant amount of monofunctional and trifunctional groups.

In order to depolymerize the crude hydrolyzates, there is added to them a catalyst and the mixture is heated at a temperature above 150° C. to produce and recover by evaporation a product consisting of low molecular weight cyclic polysiloxanes comprising, for example, about 85 percent of the tetramer and 15 percent of the mixed trimer and pentamer. When the hydrocarbons on the silicon atom are methyl, materials resulting from the presence of monomethyltrichlorosilane in this initial product produced from dimethyldichlorosilane remain as residue in the distilation vessle or tower.

The distillate, consisting essentialy of low molecular weight cyclic organosiloxane, free of any significant amount of monofunctional and trifunctional groups, is collected in a vessel. The then dried cyclic siloxane contain less than 50 p.p.m. of water. The cyclic dimethyl, methylvinyl and diphenyl cyclic siloxanes are prepared in the same way.

The pure cyclic siloxanes are added in the desired proportions in a reaction vessel so as to be subjected to an equilibration reaction to form the polysiloxanes of Formula (1). Thus, about 1.5–17 mole percent cyclic diphenylsiloxane can be added to 82–97.5 mole percent dimethyl cyclic siloxanes. Then 0.1–1.0 mole percent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added a polymerization catalyst, such as KOH. The KOH breaks the ring of cyclic siloxanes to form a potassium silanolate which has the formula,

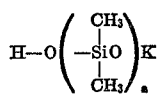

This compound, the potassium silanolate, thus can attack other cyclics to break the rings and increase the chain length of the siloxanes formed. There is further added to the reaction mixture an amount of one or more monofunctional compounds calculated to function as end-blockers for limiting the degree of polymerization and consequently the lengths and molecular weights of the linear polysiloxane chains, and for stabilizing the polymers. Usually, a small amount of monofunctional compounds are added to function as end-blockers so as to regulate the chain length of the polymers. Preferably, a compound is used as the chain-stopped groups having the formula,

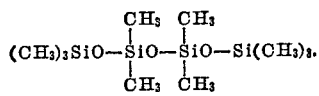

Other monofunctional compounds that may be employed satisfactorily for controlling polymer growth include, among others, hexamethyldisiloxane, tetramethyldiethoxydisiloxane, diethyltetraethoxydisiloxane and divinyltetraethoxydisiloxane.

The equilibration reaction is carried out from 2 to 4 hours until more than 60 percent of the cyclic diorganosiloxanes have converted to polymers end-stopped with monofunctional groups. After 60 percent conversion point has been reached, there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane gum which is useful in the present invention.

Alternatively, the mixture of polydiorganosiloxane may be then further reacted with the cyclic siloxanes therein and then during compounding of the mixture with process aid and fillers on a doughmixer, the remaining cyclic siloxanes may be removed by a gas purge.

The polydiorganosiloxane is produced so that it preferably registers a penetration of 50–4,000 mm. per minute on a standard penetrameter. Further, the polymer preferably has a molecular weight in the range of 100,000 to 2,000,000 and a viscosity of 100,000 to 100,000,000 centipoise at 25° C.

Hydrocarbon-substituted polysiloxanes whose pendant groups consist largely of groups other than methyl, such as ethyl or other saturated hydrocarbon groups and olefinically unsaturated hydrocarbon groups other than, or in addition to, vinyl groups can be produced by means of procedures similar to that described above or by means of procedures modified in accordance with the known characteristics of the various hydrocarbon groups to be included.

The polydiorganosiloxane gum employed is preferably produced under conditions so controlled as to avoid the incorporation therein of any significant amounts of trifunctional compounds, groups, or molecules to avoid cross-linking of linear polysiloxane chains through silicon and oxygen atoms and the incorporation therein of any significant amount of monofunctional compounds or radicals than those specifically provided to serve as end-blockers for limiting the degree of polymerization. Accordingly, the starting polydiorganosiloxane gum contains 2.0 hydrocarbon groups per silicon atom. Deviations from a ratio of 2 to 1, for example, ratios of 1.95 to 2.01, will be insignificant for all practical purposes since it will attribute to the presence of other hydrocarbon groups whose total numbers will be insignificant as compared with the total number of hydrocarbon groups attached to silicon atoms of linear polysiloxane chains.

In producing the silicone rubber composition of the present invention, there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials as titanium dioxide, iron oxide, aluminum oxide, as well as the inorganic filler materials known as inert fillers which can include among others, diatomaceous earth, calcium carbonate and quartz can preferably be employed in combination with highly-reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

There is preferably employed in the present compositions 10–100 percent by weight of said polysiloxane gum of the inorganic filler and preferably 20 to 60 percent by weight.

There is also employed in the present composition 1 to 25 percent and preferably 5 to 15 percent by weight based on the polydiorganosiloxane gum of a process aid for preventing the gum and the filler mixture from structuring prior to curing and after compounding. One example of such a process aid is a compound of the formula,

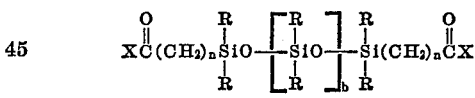

where R is a member selected from the class consisting of methyl and phenyl, X is a member selected from the class consisting of —OH, —NH₂ or —OR', where R' is methyl or ethyl, n has a value of from 2 to 4, inclusive, and b is a whole number equal to from 0 to 10, inclusive. Further details as to the properties, as well as the method of preparation of the compound of Formula (3), are to be found in the disclosure of Martellock U.S. Pat. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxy-silanes in accordance with the hydrolysis, depolymerization and fractional distillation procedures described in detail above with reference to the preparation of the gum of Formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy endblocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydrolylated materials include both monomers such as diphneylsilanediol and polymeric materials which contain two silicon-bonded OH groups in the molecule. In addition, the hydrolylated organosilane may be a mixture of hydroxyl-containing siloxanes and completely condensed siloxanes. Irrespective of the particular composition of the hydrolylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120° C. or hydrolyzing silanes of the formula $R_nSiX_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Konkle et al. U.S. Pat. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dialkyl peroxides which may have the structural formulas,

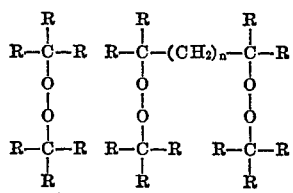

wherein R represents the same alkyl group throughout, or alkyl groups of two or more different types and $n$ is two or a larger integer.

Among the specific peroxide curing catalysts that are preferred are di-tertiary-butyl peroxide, tertiary-butyltriethylmethyl peroxide, 2,2'-bis(t-butylperoxy)diisopropyl benzene and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroacyl peroxides such as 2,4-dichlorobenzoyl peroxide, monochlorobenzoyl peroxide, benzoyl peroxide, etc. Generally, 0.1–8 percent of said peroxide, by weight of the polydiorganosiloxane gum is used to cure the silicone rubber composition and preferably 0.5–3.0 percent by weight.

There also can be incorporated into the present silicone rubber composition, pigments such as titanium dioxide which may be incorporated into the composition at a concentration of .05 to 3% by weight of the organopolysiloxane. Titanium dioxide is incorporated as a pigment into the composition of the present case in order to make the cured silicone elastomeric sheets prepared therefrom impervious to light. There may also be incorporated heat stabilizers, such as iron oxides, carbon black, rare earth octoates, urethanes, etc.

There is preferred as a heat stabilizer to be incorporated into the composition 0.1 to 5% by weight of the organopolysiloxane of $Fe_2O_3$. In the practice of the invention, the present polysiloxane composition is produced by mixing the organopolysiloxane polymer, the silica or other types of filler and the process aid. As this mixture is formed, then the asbestos fiber, the organic additive compound of the present case and the peroxide curing catalyst are mixed into the composition. At this point there may be added the iron oxide or a pigment, such as the titanium dioxide. The order of addition of the latter ingredients is not critical, it is only important that the organopolysiloxane gum, the filler and the process aid be mixed together first before the other ingredients are added. The other ingredients, such as the peroxide curing catalysts and fiber and organic additive compound, as well as the titanium dioxide and iron compound, may then be added in whatever order is desired. The various ingredients in the mixture can be blended together by use of standard rubber mixing equipment, such as doughmixer, rubber mill, Waring blender and the like. One procedure, for example, is to add the inorganic filler to the polymer gum while it is being milled, followed by the addition of the process aid and then adding the fiber, organic additive compound, peroxide curing catalyst and the other additional ingredients desired. Another procedure that can be employed is to doughmix the polymer and the inorganic filler, the process aid and the peroxide curing catalyst while it is being milled on the rubber mill and then adding the other ingredients thereafter.

Those skilled in the art would know by the properties desired in the cured product and the applications to which the cured product is to be employed, and the nature and amount of the particular ingredients utilized, the manner of blending to produce the desired organopolysiloxane composition. To form the organopolysiloxane, the polymer, inorganic filler and process aid which is optional, are added in a doughmixer and after the mixture is complete, the mixture is taken and put on a mill. While it is on the mill there is added to the mixture the peroxide curing catalyst, the hydrocarbon additive compound and the asbestos fiber in any desired order. The milled sheets are then cured in a manner well known in the art. The organopolysiloxane composition can be converted to the cured product by heating at temperatures in the range of 80° C. to 650° C., depending upon the nature of the curing catalyst, duration of cure, amount and type of filler, etc., as well as the amount of the other ingredients. The direct conversion of the polysiloxane composition to the cured product can be effected as a result of the conditions normally utilized during conventional molding, extrusion and calendering operations. For example, depending upon the curing catalyst used, the temperature from 80° to 300° C. can be employed for compression and transfer molding for either 30 minutes or more or one minute or less.

Hot air curing at the temperatures of from 100° C. to 640° C. or steam vulcanization at temperatures from 110° C. to 210° C. can be employed for periods from five to ten minutes, or a matter of seconds. The sheets can be calendered or milled first and then press-cured at 200–400° C. for 30 seconds to 10 minutes or passed into an oven where they can be air heated to a desired temperature range of 100° C. to 300° C.

In order that those skilled in the art will be able to understand the practice of the present invention, the following examples are given by way of illustration and not by way of limitation. All parts are by weight.

EXAMPLE 1

There is mixed with 100 parts of polysiloxane polymer having the formula,

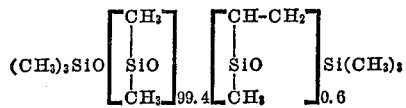

10 parts of a process aid which is methoxy-stopped and having twelve diphenyl-, dimethyl-, methylphenylsiloxy groups therein and 50 parts of silica filler to form a Basic Composition which ingredients were all mixed in a doughmixer. Afterwards various samples of the Basic Composition are taken and there is milled per 100 parts of the Basic Composition the different ingredients shown in Table I below.

TABLE I.—VARIOUS COMPOSITIONS CONTAINING FIBERS AND AN UNSATURATED ORGANIC ADDITIVE

| | Parts | | | | | | |
|---|---|---|---|---|---|---|---|
| | Control | Mixture A | Mixture B | Mixture C | Mixture D | Mixture E | Mixture F |
| Ingredients: | | | | | | | |
| Basic composition | 100 | 100 | 100 | 100 | 100 | 100 | 100 |
| Dicarbonyl perixode | 1.0 | 1.0 | 1.0 | 1.0 | 1.0 | 1.0 | 1.0 |
| Crystotile asbestos | 50 | 50 | | | | | |
| Polyester fibers | | | 55 | | | | |
| Nylon fibers | | | | 60 | | | |
| Dacron fibers | | | | | 50 | | |
| Glass fibers | | | | | | 70 | |
| Rayon fibers | | | | | | | 65 |
| X[1] | | 1.0 | | | | | |
| 2X[2] | | | 1.5 | | | | |
| 3X[3] | | | | 1.5 | | | |
| 4X[4] | | | | | 2.0 | | |
| 5X[5] | | | | | | 3.0 | |
| 6X[6] | | | | | | | 1.0 |

[1] See the following formula:

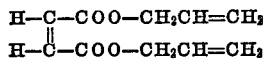

[2] See the following formula:

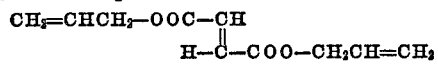

[3] See the following formula:

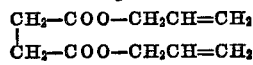

[4] See the following formula:

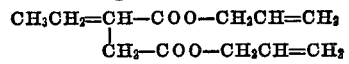

[5] See the following formula:

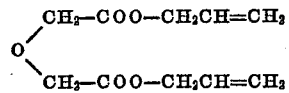

[6] See the following formula:

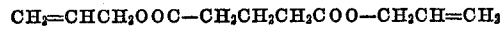

The resulting mixtures are milled into sheets which are then press-cured at a temperature of 340° F. for 1 hour. After the curing period has passed, the cured rubbers are subjected to different physical tests to determine the physical properties which are set forth in Table II below.

TABLE II.—PHYSICAL PROPERTIES OF MIXTURES TESTED

| | | Mixture | | | | | |
|---|---|---|---|---|---|---|---|
| Physical properties | Control | A | B | C | D | E | F |
| Tensile strength | 650 | 1,450 | 1,100 | 1,500 | 1,575 | 1,000 | 1,400 |
| Elongation | 380 | 80 | 40 | 40 | 80 | 240 | 50 |
| Hardness | 60 | 80 | 90 | 74 | 75 | 75 | 78 |
| Tear—Die B | 107 | 210 | 260 | 220 | 190 | 200 | 180 |
| Resilience, Bayshore, percent | 218 | 35 | 31 | 30 | 32 | 34 | 36 |

EXAMPLE 2

Samples of the same Basic Composition as were prepared in Example 1 are taken and there is milled per 100 parts of the Basic Composition the different ingredients shown in Table III below.

TABLE III.—VARIOUS COMPOSITIONS CONTAINING FIBERS AND AN UNSATURATED ORGANIC ADDITIVE

| | Parts | | | | | |
|---|---|---|---|---|---|---|
| | Mixture G | Mixture H | Mixture I | Mixture J | Mixture K | Mixture L |
| Ingredients: | | | | | | |
| Basic composition | 100 | 100 | 100 | 100 | 100 | 100 |
| Dicumyl peroxide | 1.5 | 1.5 | 1.5 | 1.5 | 1.5 | 1.5 |
| Cotton | 50 | | | | | |
| Wool | | 50 | | | | |
| Acrylate fibers | | | 50 | | | |
| Acetate fibers | | | | 50 | | |
| Anthophyllite asbestos | | | | | 100 | |
| Crocidolite asbestos | | | | | | 50 |
| 7X [1] | 3 | | | | | |
| 8X [2] | | 5 | | | | |
| 9X [3] | | | 2 | | | |
| 1Z [4] | | | | 1.5 | | |
| 2Z [5] | | | | | 1.5 | |
| 3Z [6] | | | | | | 1.5 |

[1] Methyl diallyl cyanurate

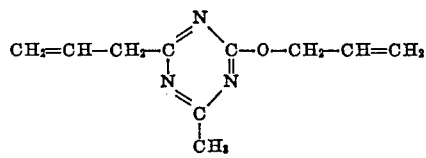

[2] Diallyl phthalate

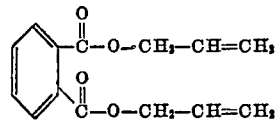

[3] Diallyl citraconate

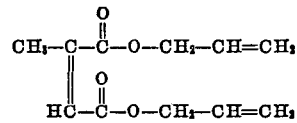

[4] Triallyl aconitate

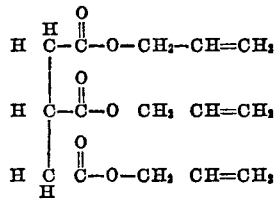

[5] Triallyl isocyanurate

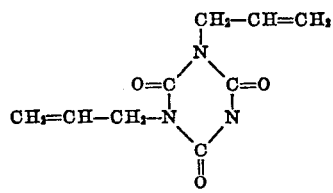

[6] Triallyl cyanurate

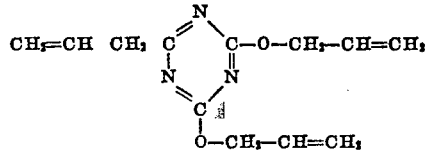

The resulting mixtures are milled into sheets which are then press-cured at a temperature of 350° F. for 1 hour. After the curing period has passed, the cured rubber is subjected to different physical tests to determine the physical properties which are set forth in Table IV below.

TABLE IV.—PHYSICAL PROPERTIES OF MIXTURES TESTED

| Physical properties | Mixture | | | | | |
|---|---|---|---|---|---|---|
|  | G | H | I | J | K | L |
| Tensile strength | 600 | 550 | 1,100 | 1,000 | 900 | 1,500 |
| Elongation | 30 | 60 | 40 | 70 | 120 | 30 |
| Hardness | 75 | 73 | 82 | 79 | 85 | 90 |
| Tear—Die B | 100 | 105 | 145 | 150 | 160 | 210 |
| Resilience, Bayshore, percent | 33 | 29 | 32 | 32 | 31 | 34 |

What is claimed is:

1. A heat curable sillicone rubber composition comprising (a) 15% to 94.75% by weight of an organopolysiloxane polymer having a concentration of 0.1 to 0.6% by weight of alkenyl radicals and having a viscosity of at least 100,000 centipoise at 25° C. of the formula, $$R_aSiO_{\frac{4-a}{2}}$$

(b) 5% to 75% by weight of an asbestos fiber, and (c) 0.25 to 10.0% by weight of an organic additive compound selected from the group consisting of,

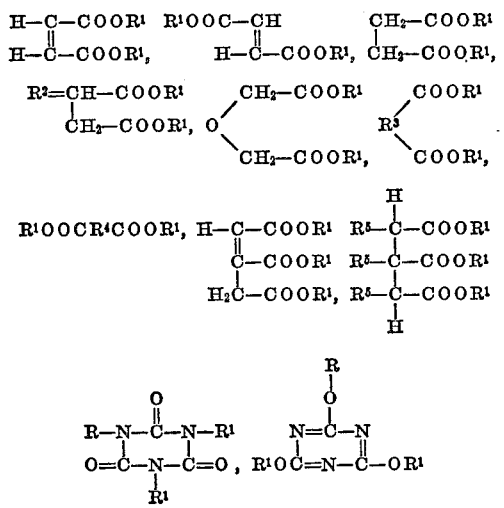

and mixtures thereof, where R and $R^2$ are radicals selected from the group consisting of monovalent hydrocarbon radicals, halogenated monovalent hydrocarbon radicals and cyanoalkyl radicals, $R^1$ is selected from unsaturated monovalent hydrocarbon radicals and unsaturated halogenated monovalent hydrocarbon radicals, $R^3$ is a divalent hydrocarbon radical of up to 20 carbon atoms, $R^4$ is an arylene radical, $R^5$ is selected from the same radicals as R and and hydrogen, and $a$ varies from 1.95 to 2.01.

2. The composition of claim 1 further including a silica filler which comprises 10% to 60% by weight of the organopolysiloxane.

3. The composition of claim 2 further including 0.1 to 8% by weight of the organopolysiloxane of a peroxide curing catalyst.

4. The composition of claim 1 wherein there is added to the organopolysiloxane a process aid which comprises 1 to 25% by weight of said organopolysiloxane where the process aid has the formula,

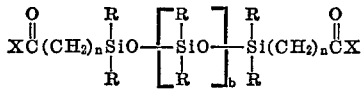

where R is a member selected from the class consisting of methyl and phenyl, X is a member selected from the class consisting of —OH, —NH₂ and $OR^1$, where $R^1$ is selected from the class consisting of methyl and ethyl, $n$ has a value of from 2 to 4, inclusive, and $b$ is a whole number equal to from 0 to 10, inclusive.

5. The composition of claim 1 wherein the organic additive compound is diallylmaleate.

6. The composition of claim 1 wherein the organic additive compound is diallylfumurate.

7. The composition of claim 1 wherein the organic additive compound is diallylsuccinate.

8. The composition of claim 1 wherein the organic additive compound is diallylitaconate.

9. The composition of claim 1 wherein the organic additive compound is diallyldiglycolate.

10. The composition of claim 1 wherein the organic additive compound is dibutenyl malonate.

11. The composition of claim 1 wherein the organic additive compound is dipentenyl adipate.

12. The compound of claim 1 wherein the organic additive compound is didecenyl sebocate.

13. A heat curable silicone rubber composition comprising (a) 15% to 94.75% by weight of an organopolysiloxane polymer having a concentration of 0.1 to 0.6% by weight of alkenyl radicals and having a viscosity of at least 100,000 centipoise at 25° C. of the formula, $$R_aSiO_{\frac{4-a}{2}}$$

(b) 5% to 75% by weight of a fiber selected from the group consisting of polyester fibers, nylon fibers, heat resistant nylon fibers, Dacron fibers, glass fibers, acetate fibers, acrylate fibers, rayon fibers, cotton fibers, wool fibers and Teflon fibers, and (c) 0.25 to 10.0% by weight of an organic additive compound selected from the group consisting of,

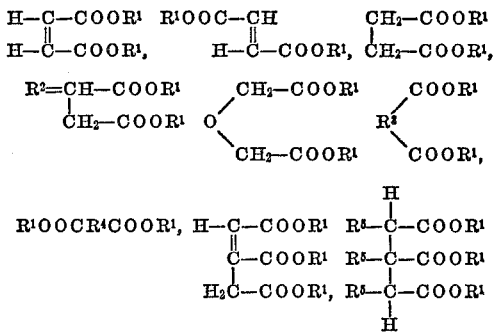

and mixtures thereof, where R and $R^2$ are radicals selected from the group consisting of monovalent hydrocarbon radicals, halogenated monovalent hydrocarbon radicals and cyanoalkyl radicals, $R^1$ is selected from unsaturated monovalent hydrocarbon radicals and unsaturated halogenated monovalent hydrocarbon radicals, $R^3$ is a divalent hydrocarbon radical of up to 20 carbon atoms, $R^4$ is an arylene radical, $R^5$ is selected from the same radicals as R and hydrogen, and $a$ varies from 1.95 to 2.01.

14. The composition of claim 13 further including a silica filler which comprises 10% to 60% by weight of the organopolysiloxane.

15. The composition of claim 14 further including 0.1 to 8% by weight of the organopolysiloxane of a peroxide curing catalyst.

16. The composition of claim 15 wherein there is added to the organopolysiloxane a process aid which comprises 1 to 25% by weight of said organopolysiloxane where the process aid has the formula,

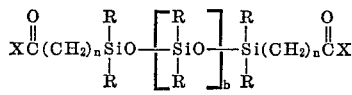

where R is a member selected from the class consisting of methyl and phenyl, X is a member selected from the class consisting of —OH, —NH$_2$ and OR$^1$, where R$^1$ is selected from the class consisting of methyl and ethyl, $n$ has a value of from 2 to 4, inclusive, and $b$ is a whole number equal to from 0 to 10, inclusive.

17. The composition of claim 13 wherein the organic additive compound is diallylmaleate.

18. The composition of claim 13 wherein the organic additive compound is diallylfumurate.

19. The composition of claim 13 wherein the organic additive compound is diallylsuccinate.

20. The composition of claim 13 wherein the organic additive compound is diallylitaconate.

21. The composition of claim 13 wherein the organic additive compound is dibutenylmalonate.

22. The composition of claim 13 wherein the organic additive compound is dipentenyl adipate.

23. The composition of claim 13 wherein the organic additive compound is didecenyl sebonate.

References Cited
UNITED STATES PATENTS

| | | |
|---|---|---|
| 3,183,205 | 5/1965 | Bailey et al. __ 260—46.5 GUX |
| 3,464,950 | 9/1969 | Wegehaupt et al. _ 260—46.5 GX |
| 3,433,760 | 3/1969 | Clark et al. _____ 260—37 S B |
| 3,198,766 | 8/1965 | Nitzsche et al. _____ 260—827 X |
| 3,488,304 | 1/1970 | Baugh et al. _____ 260—827 UX |

LEWIS T. JACOBS, Primary Examiner